L. G. MORRIS.
CUTTING TOOL.
APPLICATION FILED JUNE 30, 1920.

1,357,075.

Patented Oct. 26, 1920.
2 SHEETS—SHEET 1.

WITNESSES

INVENTOR
L. G. Morris
BY
ATTORNEYS

L. G. MORRIS.
CUTTING TOOL.
APPLICATION FILED JUNE 30, 1920.
1,357,075.
Patented Oct. 26, 1920.
2 SHEETS—SHEET 2.
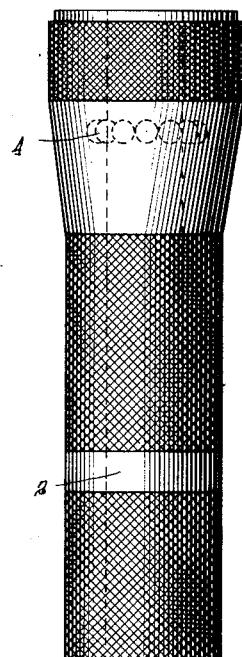
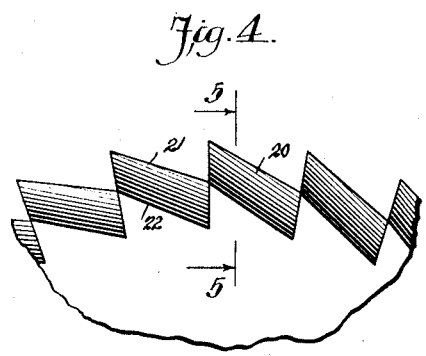
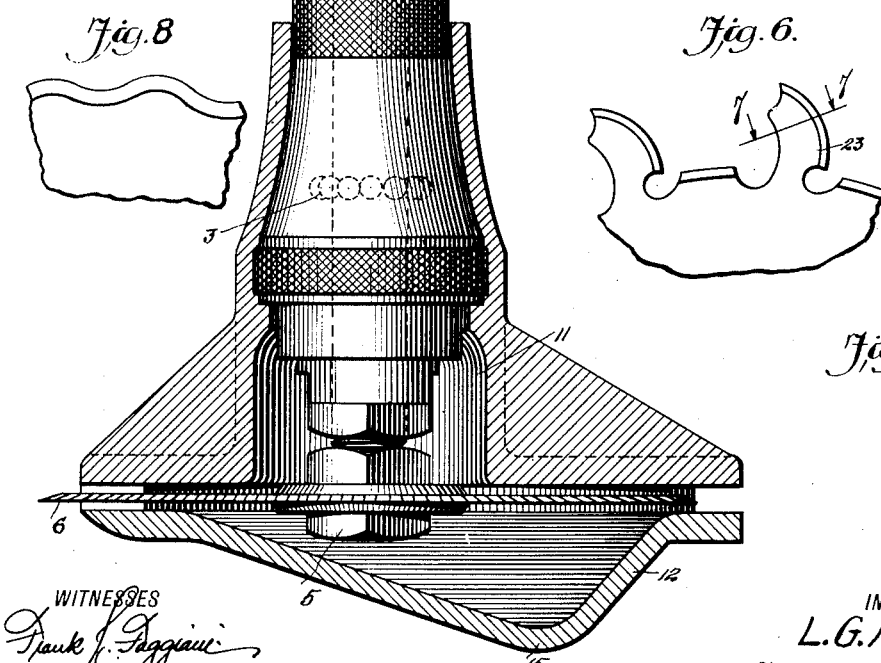
WITNESSES
INVENTOR
L. G. Morris
BY
ATTORNEYS

UNITED STATES PATENT OFFICE.

LEWIS GOUVERNEUR MORRIS, OF NEW YORK, N. Y.

CUTTING-TOOL.

1,357,075.    Specification of Letters Patent.    Patented Oct. 26, 1920.

Application filed June 30, 1920. Serial No. 392,924.

*To all whom it may concern:*

Be it known that I, LEWIS G. MORRIS, a citizen of the United States, and a resident of the city of New York, borough of Manhattan, in the county and State of New York, have invented a new and Improved Cutting-Tool, of which the following is a full, clear, and exact description.

This invention relates to cutting tools, and has particular reference to such a device as is adaptable for removing the skin from an animal.

An object of the invention is to provide a simple, compact cutting device whereby the skin of an animal, such as a shark, may be rapidly and efficiently removed.

Another object is to provide a cutting device in which the maximum amount of power may be transmitted without undue heating under varying degrees of pressure with which the device is applied to the carcass from which the skin is to be removed.

A further object is to provide a cutting device which has a support whereby it may be readily and quickly moved during the cutting operation to facilitate the process of cutting.

Another object is to provide a simple, strong and effective cutting edge which is particularly adapted to remove a skin which adheres intimately to the body of an animal, such as a shark, without unnecessarily mutilating either the body portion or the skin.

Another object is to provide a device which is simple in its assembly, so as to facilitate dismounting for repair and cleaning.

A still further object is to provide the particular arrangement and construction of parts which is hereinafter set forth in the description and claims and shown in the drawings.

The invention in general comprises a power shaft to the end of which, at right angles thereto, is connected a rotatable cutting edge. Along its length, adjacent the cutting edge, the power shaft is journaled in a handle or support in which are provided suitable friction bearings, whereby the pressure, due to the application of the cutting edge to the carcass of an animal, is absorbed without undue generation of heat. The lower end of the handle or support and both sides of the cutting edge are inclosed by a suitable casing which is made in sections adaptable for ready dismantling. This casing is open at one portion and so disposed that a small portion of the periphery of the cutting edge is exposed, whereby all the cutting edge excepting the portion desired for cutting is suitably incased and protected. The bottom of the casing is provided with a curved surface which adapts it for placement on the carcass of the animal and ready movement on said carcass with a minimum disturbance of the cutting edge from the line of cut established.

The invention is illustrated in the drawings, of which—

Fig. 3 is a partial vertical longitudinal section;

Fig. 4 is a partial enlarged detail view of the cutting tooth of the device;

Fig. 5 is a section taken on the line 5—5 of Fig. 4;

Fig. 6 is an enlarged detail partial view of a different form of cutting edge;

Fig. 7 is a section taken on line 7—7 of Fig. 6; and

Fig. 8 is still another modification of the form of the cutting edge.

Figure 1:
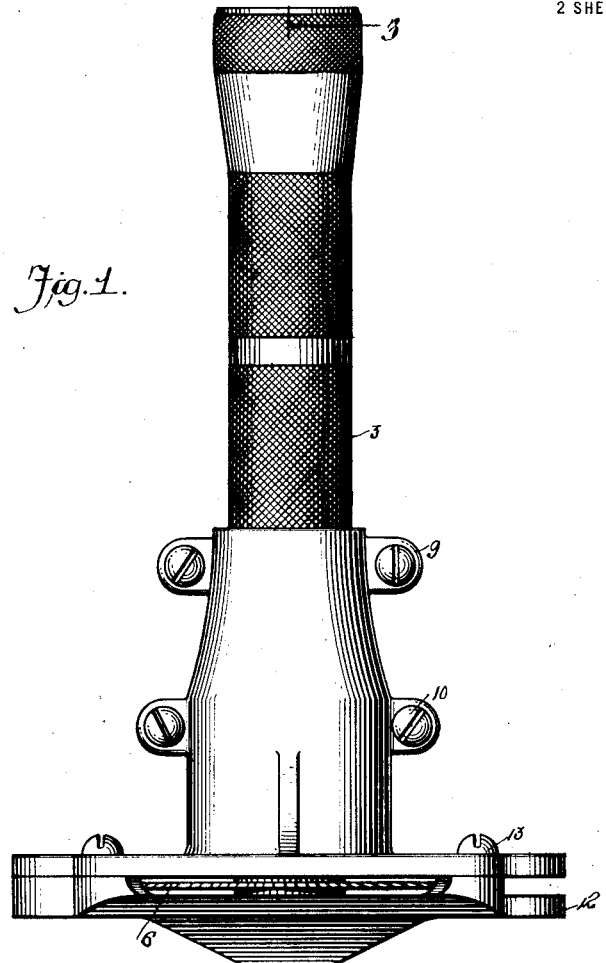
Figure 1 is an elevation of the assembly.

The device which embodies my invention, and which is shown in the drawings, comprises a hollow handle portion 1 within which a shaft 2 is journaled in suitable bearings 3 and 4. This shaft 2 at its lower end is connected by suitable nuts 5 to a rotary cutting surface 6 in the form of a circular saw. This circular saw is preferably made of very hard tool steel capable of maintaining a very sharp edge at high speed while being applied to work under high pressure. It will be noticed that the power shaft is directly connected to the cutting blade without the intervention of any gearing or other mechanism and that the power shaft is suitably journaled in friction roller bearings along its axis in planes parallel to the plane of the cutting blade. It will, therefore, be apparent that when the cutting blade is moved under pressure toward an object to be cut, the shaft can efficiently transmit power thereto without undue heating, because the pressure between the shaft and the bearing is absorbed with a minimum amount of heating effect.

The lower end of the hollow handle portion 1 is provided with projecting ring portions which are formed to adapt the same to engage with correspondingly curved portions in a casing member which surrounds and snugly embraces the lower end of the handle portion 1. This casing member is composed of two sections 7 and 8 which may be suitably fastened together by means of ear portions 9 and screw bolts 10.

Figure 2:
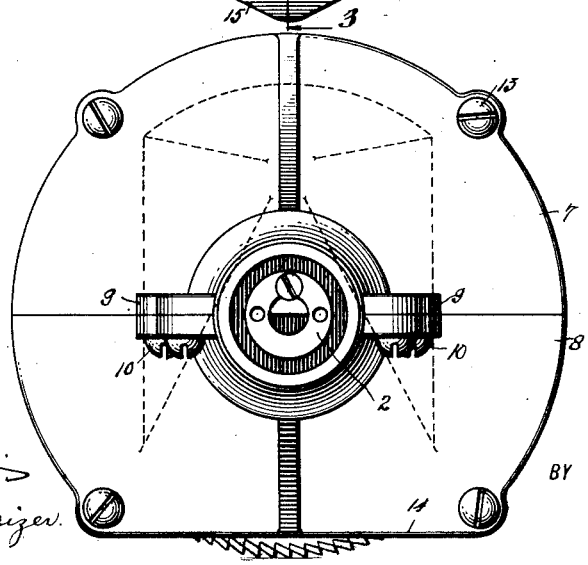
Fig. 2 is a plan view.

When assembled together the casing members 7 and 8 form an inner bore 11 into which the lower end of the handle portion 1 and the shaft 2 project. On the opposite side of the cutting member 6 from the casing members 7 and 8 there is attached thereto another casing member 12. This member 12 is fastened to the members 7 and 8, as shown in Figs. 1 and 2, by any suitable means, such as screw bolts 13. It will be observed that the configuration of the edges of the casing members, particularly those edges which are adjacent and in the plane of the cutting member 6, is such as to completely inclose the cutting edge 6 excepting along one portion of the edge of the casing. This portion, which I designate by the numeral 14, is in the form of a straight edge which approximates a chord of the circle formed by the outer edges of the casing members in the plane of the cutting edge 6, as seen in Fig. 2. By providing this straight edge portion 14 the cutting edge 6, for a certain distance along its periphery, will project slightly beyond the protecting edges of the casing and thereby be accessible for use to cut.

It will be noticed that the lower surface of the casing member 12 is provided, as seen more clearly in Fig. 3, with a surface which is substantially concave along that part of the surface which extends rearwardly of the casing member 12 from a point adjacent the exposed part of the cutting edge 6. The effect of the curvature above mentioned results in the formation of the casing member 12 with a downwardly projecting area, which I designate by the numeral 15, which is slightly axially off center with respect to the axis of the shaft 12. This portion 15 provides a projecting area upon which the tool may rest, and which may act in some circumstances as a pivot point from which the tool can be more or less accurately guided in its cutting movement. The concavity of the surface of member 12, which extends from the portion 15 to a point adjacent the exposed portion of the cutting edge 6, is provided so that when the lower portion of the casing is placed in contact with the body of an animal from which the skin is to be removed, the lower portion of the casing will fit the carcass more snugly than if this portion of the surface were flat. By reason of this snug fit, the tool can be moved easily from one point to another in its cutting operation without moving the cutting edge from the line of cutting to any great degree.

As shown in Figs. 4, 5, 6, 7 and 8, an especial form of cutting edge is provided which is so shaped as to approximate the slicing action of a knife in its operation. As shown in Fig. 4, one form of this blade is made by providing teeth 20 on one side only of the cutting surface or edge 6. These teeth are formed with surfaces having outer and inner edges 21 and 22. The outer edge 21 extends rearwardly and outwardly with respect to the center of the cutting surface or edge 6 as well as with respect to the direction of movement of the cutting edge 6. The plane surface formed between the edges 21 and 22 is sloped in such a manner that a line perpendicular to the outer edge 21 and parallel to the surface of the tooth immediately above mentioned, will extend upwardly toward the axis of shaft 2 and to a point rearward of the same with respect to the direction of motion of the cutting edge 6. A careful consideration of this tooth and the slope of its cutting face will show that its action on any object approximates a slicing action which might manually be given a knife in slicing a skin from a carcass.

A similar action results from the use of the blade shown in Fig. 6, in which a plurality of knife portions 23 are provided, the front portion of which is sharpened, as shown at 24, and the body of the blade itself gradually increases the thickness from the front to the rear edge of the blade. The front edges of the blades 23 are curved in a sort of cam fashion and slope outwardly and rearwardly with respect to the center of rotation and the direction of movement of the cutting edge and give a very effective action. For certain other types of work, a slight sloping wavy edge, as shown in Fig. 8, may be used.

In the operation of the device, the handle portion 1 may be gripped and the cutting member or edge 6 revolved at high speed, in the neighborhood of 3500 to 4000 revolutions per minute, and receiving its power through any suitable flexible shafting from a motor or other engine. By placing the lower portion of the casing on the carcass of the animal in the neighborhood of the portion to be cut, more attention can be paid, in the use of the hands, to force the knife into the carcass at the required place and to the required depth to sever the skin from the body than could otherwise be the case. When such skins as shark skins are to be removed, a device of this kind is especially useful, since the fibers of a shark skin extend very deeply into the main body of the animal and it is exceedingly difficult to remove the skin from the body without using considerable pressure and without having a very hard, sharp, tough knife, which, in the case of rotating edges, must be revolved at high speed and must be constructed so as to withstand the application of heavy pressures thereto, in the neighborhood of one hundred pounds or more, without undue heating of the bearings.

When the cutting edge 6 is being used in the act of severing a skin from a body, the pressure applied by the hands to the portion 1 is transmitted through the cutting edge 6 and along said edge in a plane thereof extending from the center to the edge. The resistance offered by the body portion being cut, to the pressure, reacts on the shaft 2 and from this to the bearings 3 and 4. If these bearings were not roller bearings, or some other similar bearings, the use of which results in a minimum amount of friction, the handle portion would very soon become so hot that it could not be held in the hand.

To dismantle the device, it is only necessary to remove the screw bolts which hold the part 12 to the upper parts and to remove the screw bolts which hold the two upper portions together, whereupon the casing can be removed and the cutting edge 6 can easily be removed from the shaft by removing the nuts 5. This simple arrangement, therefore, can be readily dismantled and, on account of the small number of parts and the simplicity of their structure, can be readily cleaned.

What I claim is:

1. A cutting device for skinning animals, comprising a rotating cutting edge and a casing connected thereto and substantially inclosing the same, said casing having a bottom portion near the cutting edge of said device, said bottom portion being curved to simulate the curvature of the body from which the skin is to be removed.

2. A cutting device for skinning animals, comprising a rotary cutting edge, a power shaft connected thereto in line with the axis thereof, a support for said shaft, roller bearings in said support along said shaft, and a casing substantially inclosing said cutting edge, said casing having a portion cut away to expose a portion of the cutting edge.

3. A cutting device for skinning animals, comprising a rotary cutting edge, a power shaft connected thereto in line with the axis thereof, and a casing substantially inclosing said cutting edge, said casing having a portion cut away to expose a portion of the cutting edge.

4. A cutting device for skinning animals, comprising a rotary cutting edge, a power shaft connected thereto in line with the axis thereof, a support for said shaft, roller bearings in said support along said shaft, a casing connected to said support and substantially inclosing said cutting edge, said casing having a portion cut away to expose a portion of the cutting edge.

5. A cutting device for skinning animals, comprising a rotary cutting edge, a power shaft connected thereto in line with the axis thereof, and a casing substantially inclosing said cutting edge, said casing having a portion cut away to expose a portion of the cutting edge, the bottom of said casing near the cutting edge of said device being curved to simulate the curvature of the body from which the skin is to be removed.

6. A cutting device for skinning animals comprising a metallic plane surface and a tooth on said surface, the outer edge of said tooth lying in the plane of said surface and extending outwardly and rearwardly with respect to the center of the surface and the direction of movement of the surface in cutting.

7. A cutting device for skinning animals comprising a rotary metallic plane surface and a tooth on said surface, the outer edge of said tooth lying in the plane of said surface and extending outwardly and rearwardly with respect to the center of the surface and the direction of movement of the surface in cutting, the cutting surface of the tooth being inclined so that a line drawn perpendicular to the outer edge and parallel to the cutting surface of the tooth is inclined upwardly toward the axis of the cutting device and rearwardly of the same with respect to the direction of movement of the plane surface.

LEWIS GOUVERNEUR MORRIS.